United States Patent Office 3,424,803
Patented Jan. 28, 1969

3,424,803
METHODS FOR THE SYNTHESIS OF 1-NITRO-3-(1-METHYL - 3,3,3 - TETRACHLOROPROPYL) STYRENE AND INTERMEDIATE USEFUL FOR SAME
Carleton W. Roberts and Richard Garth Pews, Midland, Mich., assignors to The Dow Chemical Company, Midland, Mich., a corporation of Delaware
No Drawing. Filed July 24, 1967, Ser. No. 655,343
U.S. Cl. 260—646    5 Claims
Int. Cl. A01m 9/20; C07c 79/00

ABSTRACT OF THE DISCLOSURE

Methods of synthesis of 1-nitro-3-(3,3,3-trichloro-1-methylenepropyl)benzene, useful as an herbicide, and its intermediate, 1-nitro-3-(1,3,3,3 - tetrachloro-1-methylpropyl)benzene, from 1,1-dichloroethyl-3-nitrobenzene and vinylidene chloride.
Method:

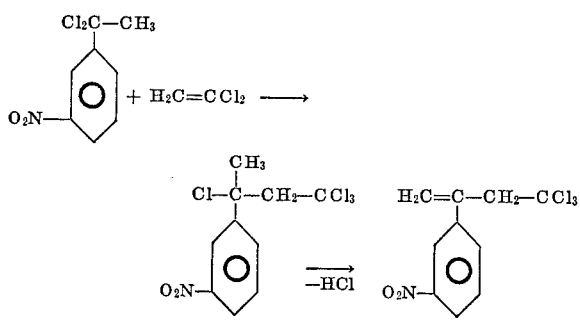

BACKGROUND OF THE INVENTION

Field of the invention 1-nitro-3-(3,3,3-trichloro - 1-methylenepropyl)benzene has desirable properties as a selective herbicide. The compound can be made available for general use only if it can be produced relatively inexpensively.

Description of the prior art 1-nitro-3-(3,3,3-trichloro - 1-methylenepropyl)benzene has been prepared hitherto as a mixture of the subject m isomer with the very infereior o and p isomers by direct nitration of α-(2,2,2-trichloroethyl)styrene using, for example, acetyl nitrate. When m-nitro-α-methylstyrene is available in satisfactory purity, it can be reacted with carbon tetrachloride to obtain the subject compound: a free-radical initiator, such as an organic peroxide, is useful in accelerating the reaction. However, m-nitro-α-methylstyrene has hitherto been expensive and difficult to synthesize. None of the methods yields desired compound in good purity economically.

SUMMARY OF THE INVENTION

The present invention is directed to a useful intermediate:

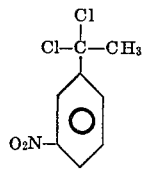

and to its reaction with vinylidene chloride (CH$_2$=CCl$_2$), resulting in the preparation of the addition product of the formula

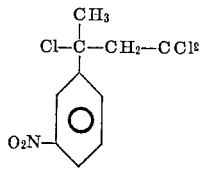

This addition product is then optionally dehydrohalogenated to obtain 1-nitro-3-(3,3,3-trichloro-1-methylenepropyl)benzene.

The intermediate useful in this synthetic route is itself readily prepared, either by chlorination, under mild conditions, of ethylbenzene, followed by nitration to introduce the meta nitro group; or by nitration, which tends to be predominantly m-nitration, of acetophenone followed by chlorination with phosphorus pentachloride.

DESCRIPTION OF THE PREFERRED EMBODIMENTS

By the methods summarized, foregoing 1-nitro-3-(3,3,3-trichloro-1-methylenepropyl)benzene can be obtained readily, in good yield, and hence at an economically acceptable cost.

In all of the preferred embodiments of the present invention the, novel intermediate, 1,1-dichloroethyl-3-nitrobenzene:

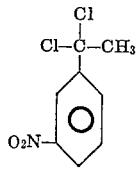

obtained by either synthetic route hereinbelow discussed in more detail, is reacted with vinylidene chloride, yielding the desired 1-nitro-3-(1,3,3,3-tetrachloro-1-methylpropyl)benzene:

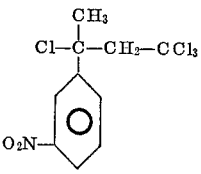

The addition of vinylidene chloride to 1,1-dichloroethyl-3-nitrobenzene goes forward under conditions, and in the presence of catalyst, that are routine for Friedel-Crafts reactions. Exact operating condition details and identity of Friedel-Crafts catalyst may have a bearing on ultimate efficiencies but are not critical to this invention.

In somewhat greater particularity, ethylbenzene is chlorinated by the direct introduction into it, alone or in the presence of solvent that is non-reactive under employed conditions, of elemental chlorine. Chlorination is carried out under mild conditions; more particularly, chlorination is carried out at or near or below atmospheric pressure; at moderate temperatures such as temperatures up to, but seldom exceeding 60° C.; and in the presence of light if desired. Under these conditions chlorination takes place almost exclusively on the α-carbon of the ethyl substituent upon the benzene nucleus; and amounts of styrene derivatives formed as side products are negligible. Also, ring chlorination is negligible.

Advantage is next taken of the meta-directing influence of the 1,1-dichloroethyl- moiety upon the aromatic nucleus. Nitration subsequently carried out under suitable conditions, and without significant excess of nitrating agent, is strongly, almost exclusively, directed to the position of the aromatic nucleus that is meta- with respect to the dichloroethyl moiety. Nitration is carried out by the action of anhydrous, or fuming, or white nitric acid, in the presence of sulfuric acid. These procedures, antecedent to the present invention, prepare, in good yield and purity, 1,1-dichloroethyl-3-nitrobenzene.

This substance is then reacted with vinylidene chloride in the manner of one of the reactions known as "the Prins reaction." This reaction has been described. See "Friedel-Crafts and Related Reactions" (Interscience, New York) 1964, edited by Olah, volume II, Part 2, chapter 28, pages 1133–1173, "Condensation of haloalkanes . . . etc." and the references there cited. The chapter and its references are incorporated here.

Catalysts successfully employed include ferric chloride, bismuth trichloride, aluminum chloride, and a wide range of other, less widely used Friedel-Crafts catalyst substances. In general, when employing ferric chloride, temperatures can be approximately room temperature; when employing bismuth trichloride, moderately exalted temperatures but yet below the boiling temperature of water give good results. In contrast, aluminum chloride is so active that temperatures substantially below the freezing temperature of water are usually preferred, especially in view of the evolution of substantial amounts of heat of reaction.

The reaction is a direct addition, and, under appropriate conditions, by-products of reaction occur in only small amounts. Thereafter, the resulting 1-nitro-3-(1,3,3,3-tetrachloro-1-methylpropyl)benzene product is separated and purified if desired. When it is desired to obtain 1-nitro - 3 - (3,3,3-trichloro-1-methylenepropyl)benzene, the foregoing product of reaction is simply dehydrohalogenated to obtain the unsaturated product directly, in good yield, in a single last step.

More particularly, the dehydrohalogenation is an acid-catalyzed reaction which goes forward promptly in the presence of acid catalyst and with at least trace amounts of water, such as amounts of water adhering substantially unremovably to vessel walls and the like; the dehydrohalogenation goes forward in the absence of initial catalyst or water at a temperature in the range of 40–60° C., and, by its autocatalytic effect, once initiated goes forward with increasing rapidity. Alternatively, trace amounts of water and hydrogen chloride are added; or, if more easily available or more easily removed subsequently, a Lewis acid such as zinc chloride or ferric chloride is used. As is customary with catalyst, small amounts, only, are required and precise quantity is not critical. Ferric chloride is often already present in small, catalytic amounts and, usually, no more need be added.

When product of the present invention is intended to be used as an herbicide, and more particularly, for use as a general herbicide in which use the presence of impurities in small amounts is not objectionable, product of this invention can be employed directly as synthesized. When impurities are undesired, or when, to exhibit highly selective herbicidal activity, impurities are inadmissable, purification of product proceeds in manners that are known to those skilled in the art. In one form, with chilling, the product is crystallized selectively and the crystallized product washed to remove impurities; in other procedures, the product is distilled. Other purification procedures, being essentially routine, will be known to those skilled in the art.

The following examples set forth the present invention with greater particularity and represent the best mode of practicing the invention now known to the inventors.

EXAMPLE 1

Preparation of $\alpha,\alpha$-dichloroethyl benzene

A 250 milliliter round bottomed flask is provided with a four hole stopper, and provided further with magnetic stirring means, thermocouple connected with temperature recorder; reflux condenser of which the cooling chamber carries refrigerated water; dropping funnel provided with stem stop cock, and gas inlet ending in a fritted sparger.

The flask is charged initially with 106.2 grams (1 gram molecular weight) of ethyl benzene, a colorless, aromatic liquid which remains liquid over a wide range of temperatures. Stirring is begun and gaseous chlorine is introduced slowly and sparged through the ethyl benzene, entering contact therewith in the form of fine bubbles. Characteristically, the bubbles diminish in size as they float upwards through the ethyl benzene and chlorine pressure is adjusted to supply gaseous chlorine at a rate such that most of the bubbles of gas disappear by reaction before they burst through the upper surface of the pool of ethyl benzene. Thermometer readings are taken periodically and it is noted that as chlorination proceeds temperature of the flask contents rises. From an initial temperature of approximately 24° C., room temperature, the temperature rises to 36° C.; at this temperature the rate of chlorine feed is reduced and thereafter maintained at a rate lower than that initially supplied, to limit evolution of heat of reaction to a rate approximately that of heat loss from the flask; the entire chlorination is carried out at temperatures not exceeding 40° C.

Head space in the flask above the reacting liquid pool is periodically swept with nitrogen and the swept gas tested for hydrogen chloride. Hydrogen chloride evolution is found to begin promptly upon introduction of chlorine, rises to a peak rate, and thereafter goes forward at a gradually declining rate. When the rate of evolution of hydrogen chloride appears to drop to a minimum value or such evolution ceases, the $\alpha,\alpha$-dichlorination of the ethyl benzene is assumed to have become complete. Thereupon, after approximately ninety minutes chlorination, the chlorine feed is disconnected, the resulting product is weighed and found to have a weight of 177.5 grams, somewhat more than theoretical for the stoichiometric amount of $\alpha,\alpha$-dichloroethyl benzene product. The resulting product is distilled under subatmospheric pressure, the first and last portions of product to be distilled being discarded; the distilled product is then taken as starting material in the next example.

EXAMPLE 2

Preparation of m-nitro-$\alpha,\alpha$-dichloroethyl benzene

In apparatus substantially similar to that described foregoing but lacking the sparging gas inlet apparatus, the distilled product of Example 1 is used as starting material in the preparation of its m-nitro derivative. The product is placed in the flask, and thereto is added, slowly, in small portions, and with stirring, 163 grams, about 1 gram mole, of a nitration mixture, equimolecular amounts of anhydrous sulfuric acid and anhydrous nitric acid. The addition is carried out over a period of approximately 2 hours over an ice bath and at a temperature of approximately 0° C. Upon the completion of the addition of the anhydrous nitric acid, a further reaction period of one-half hour at the indicated temperature is provided, to carry the nitration substantially to completion.

Upon completion of the nitration, the resulting product separates as a precipitate from the nitration mixture and is removed by filtration, and washed with small portions of 1,1-dichloroethylene. The resulting m-nitro-$\alpha,\alpha$-dichloroethyl benzene, of a molecular weight of approximately 220, is a pale yellow, mobile aromatic liquid having distinct sternutatory and lachrymatory properties; the compound is useful as a hydrochlorinating agent for basic substances; the introduction of the compound into a reaction mixture does not significantly alter pH. It is also used as an intermediate in further reaction of the present invention as indicated hereinafter.

EXAMPLE 3

Preparation of m-nitro-α,α-dichloroethylbenzene from benzophenone

Acetophenone (120 grams; approximately one grammole) is nitrated in the method of Corson and Hazen. See "Organic Syntheses," (John Wiley & Sons, New York) 1943 Collective Volume 2, edited by Blatt, pages 434 and following, here incorporated by reference. The resulting m-nitroacetophenone is dispersed in dichloromethane and to it is added a slight molar excess of phosphorus pentachloride, at a temperature of from −5° to +15° C., with cooling and stirring, under substantially anhydrous conditions and with nitrogen blanket. The addition of phosphorus pentachloride is carried out slowly and portion-wise. Each addition is accompanied by active reaction.

Upon completion of the reaction, the resulting mixture is placed under high vacuum and gently warmed to volatilize and remove excess phosphorus pentachloride and also phosphorus oxychloride of reaction. In a first carrying out of the instant preparation, nitrogen headspace sweep is recurringly tested for hydrogen chloride, and purification steps discontinued when hydrogen chloride appears in more than trace amounts.

The product of this example is used, in situ, interchangeably with the product of example two. As between them, a choice will be based on largely economic factors, such as prices of starting materials.

EXAMPLE 4

Preparation of 1-nitro-3-(1,3,3,3-tetrachloro-1-methylpropyl)benzene

The m-nitro-α,α-dichloroethyl benzene product as prepared in either example two or example three (about 180 grams) is placed, together with 100 grams dichloromethane, as solvent, in a flask equipped in manner similar to that described, foregoing. The mixture is cooled over a water and ice and salt bath, and 90 grams refrigerated 1,1-dichloroethylene ("vinylidene chloride"), with five grams ferric chloride dispersed in it is added slowly, portionwise, and with stirring, under nitrogen blanket and under essentially anhydrous conditions. Material awaiting use is maintained under refrigeration and introduced as a liquid. Under the employed conditions, a reaction of direct molecular addition takes place promptly, with liberation of substantial heat of reaction. Temperatures of the reaction mixture are maintained at all times below +15° C. and characteristically in the range of −10° to +10° C. Modest excess of 1,1-dichloroethylene is added, to assure completion of the synthesis.

Upon completion of the addition reaction, the temperature of the resulting reaction mixture is equilibrated with room temperature, and excess vinylidene chloride substantially removed. The resulting material is then placed under declining subatmospheric pressure and is slowly warmed to vaporize and remove dichloromethane solvent.

As a result of these procedures there is obtained about 260 grams of 1-nitro-3-(1-methyl-1,3,3,3-tetrachloropropyl)benzene as a yellow-brown substance melting at a temperature (not exactly determined) slightly above room temperature, and crystallizing readily when chilled as the container confining it is scratched. It is of a molecular weight of 317 to a close approximation.

EXAMPLE 5

Preparation of 1-nitro-3-(3,3,3-trichloro-1-methylenepropyl)benzene

The 1-nitro-3-(1,3,3,3-tetrachloro-1-methylpropyl)benzene product of Example 3 is gently warmed to liquefy it, and into it is conducted a small amount—on the order of 50 milligrams—moist hydrogen chloride vapor. The vapor appears to be sorbed: it disappears. Thereafter, the resulting composition is warmed to a temperature in the range of 40–60° C., being held nominally at 50° C., and ambient atmospheric pressure is gradually lowered, to facilitate removal of evolved hydrogen chloride.

Under these conditions hydrogen chloride is evolved, with incipent, trace ebullition. Hydrogen chloride is dehydrated over anhydrous calcium chloride and thereafter passed into a liquid amine (presently pyridine) which takes it up, entire; of which the weight gain measures the evolution of hydrogen chloride.

Dehydrohalogenation is continued until a weight gain of the reacting pyridine representing approximately 30 grams hydrogen chloride is observed. Product is then cooled to room temperature.

The resulting product is an oily liquid having a refractive index at 25° C. for the D line of sodium light of 1.5840 as compared with water at 25° C. It boils in the range of 155–165° C. under pressure of 1 millimeter of mercury, absolute. It is useful as a selective herbicide for the control of monocotyldeonous plants.

We claim:
1. Method which comprises reacting 1-nitro-3-(1,1-dichloroethyl)benzene, of the formula

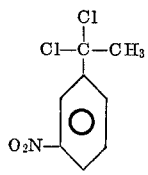

with 1,1-dichloroethylene in the presence of a Friedel-Crafts catalyst, whereby there is obtained 1-nitro-3-(1-methyl-1,3,3,3-tetrachloropropyl)benzene, of the formula

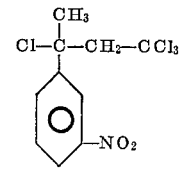

2. The method of claim 1 wherein the Friedel-Crafts catalyst is aluminum chloride.
3. The method of claim 1 wherein the 1-nitro-3-(1,1-dichloroethyl)benzene is prepared by a series of steps comprising
   (1) reacting ethylbenzene with chlorine in the presence of light and under temperatures of less than 60° C., to obtain (1,1-dichloroethyl)benzene; and thereafter
   (2) nitrating (1,1-dichloroethyl)benzene with nitric acid in the presence of sulfuric acid to obtain 1-nitro-3-(1,1-dichloroethyl)benzene.
4. Method of claim 1 wherein the 1-nitro-3-(1,1-dichloroethyl)benzene is prepared by
   (1) nitrating acetophenone to obtain m-nitroacetophenone; and thereafter
   (2) reacting the m-nitroacetophenone with phosphorus pentachloride whereby there is obtained 1-nitro-3-(1,1-dichloroethyl)benzene.
5. 1-nitro-3-(1,1-dichloroethyl)benzene.

References Cited

UNITED STATES PATENTS 3,107,200  10/1963  Bird _____ 260—646 X
3,336,401  8/1967  Morris _____ 260—646

LELAND A. SEBASTIAN, *Primary Examiner.*

U.S. Cl. X.R.

71—125; 204—163; 260—645